Patented Feb. 13, 1923.

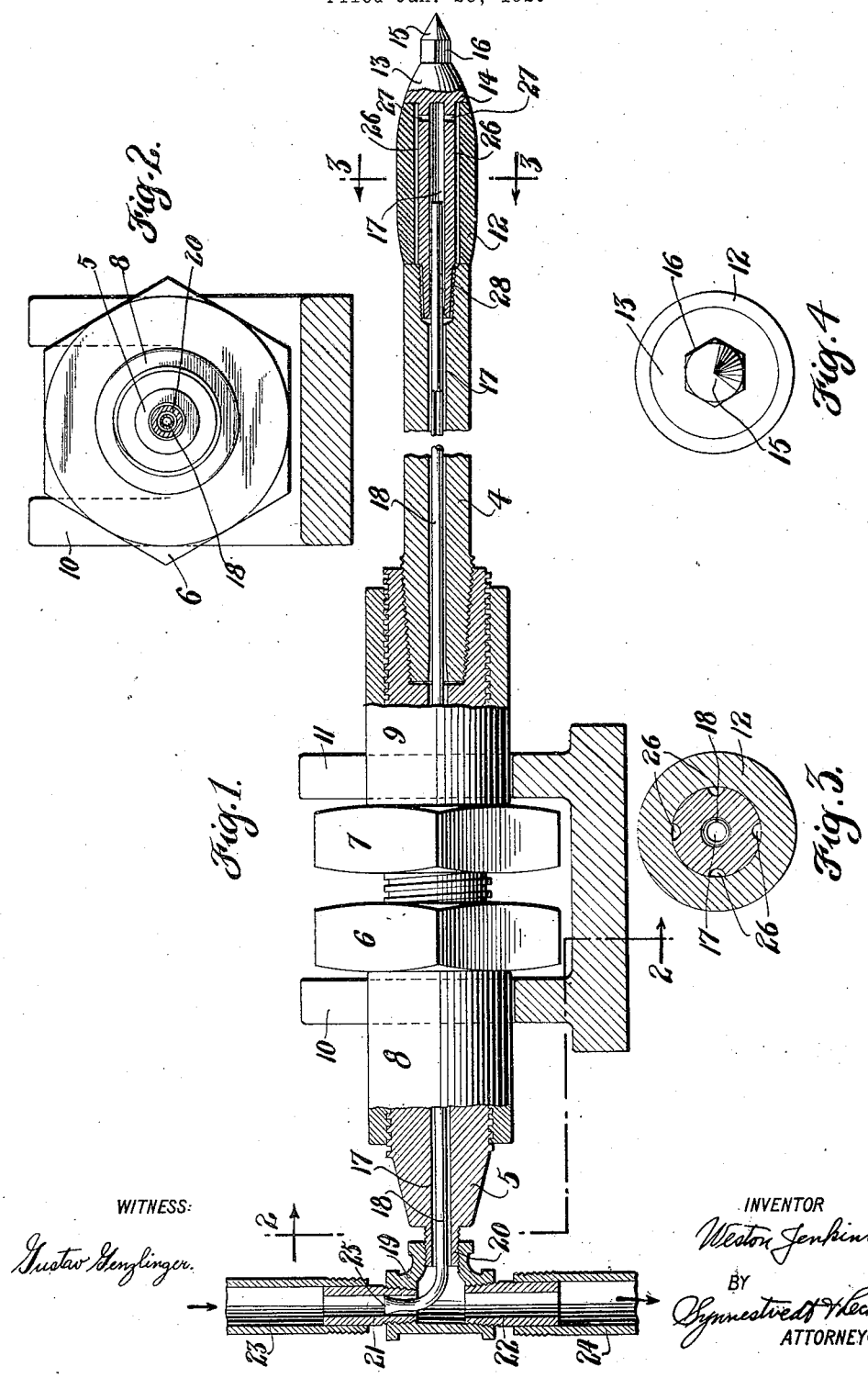

1,445,139

UNITED STATES PATENT OFFICE.

WESTON JENKINS, OF ROME, NEW YORK, ASSIGNOR TO ROME IRON MILLS, INC., A CORPORATION OF NEW YORK.

MANDREL.

Application filed January 26, 1920. Serial No. 353,957.

*To all whom it may concern:*

Be it known that I, WESTON JENKINS, a citizen of the United States, residing at Rome, in the county of Oneida and State of New York, have invented certain new and useful Improvements in Mandrels, of which the following is a specification.

This invention relates to mandrels and particularly to mandrels which are designed for use in connection with rolling mill operations where the product is first heated and then handled in its hot state. Specifically it relates to an improved construction whereby such a mandrel may be fluid cooled. My invention is of especial usefulness and value in the rolling of hollow tubes in connection with which use it is necessary to provide the mandrel with an aperture forming member or ball which is brought into contact with the inner wall of the hot tube. The heat has a very destructive effect upon the metal of the ball which necessitates more or less frequent renewal. It is the particular object of my invention to provide a mandrel in which the ball is readily detachable and which at the same time may be cooled by means of a fluid forced in through a tube in the supporting bar to a chamber or series of chambers between the bar and the ball and then out again through a suitable discharge passage. Thus in a mandrel provided with a detachable ball so that renewal thereof may be readily accomplished, I provide a constant circulation of a cooling fluid which reaches the point where the greatest destructive effect of the heat is encountered.

The above, together with such other objects as may hereinafter appear, or are incident to my invention, I obtain by means of a construction which I have illustrated in preferred form in the accompanying drawing, wherein Figure 1 is a longitudinal section and partial side elevation of a mandrel embodying my invention; Figure 2 is a section on the line 2—2 of Figure 1; Figure 3 is a section on the line 3—3 of Figure 1; and Figure 4 is an end view of the detachable head and ball used in connection with my invention; Figures 3 and 4 being upon an enlarged scale.

Referring to the drawing, the supporting bar or rod portion 4 of my mandrel is taper threaded into the socket 5 upon the exterior of which is threaded the two adjusting nuts 6 and 7 with their respective locking collars 8 and 9. The nuts fit between a pair of U-shaped fixed supports 10 and 11. The position of the ball 12 at the end of the supporting bar 4 may be adjusted within certain limits by means of these nuts 6 and 7 which can be locked in position by the collars 8 and 9.

A detachable head or end member 13 is threaded into the supporting bar 4 and is provided with a shoulder 14 between which and the outer face of the bar 4 is gripped the tubular ball 12. The point 15 constitutes a convenient guide for entering the mandrel into the hollow tube and a suitable hexagonal or square portion 16 supplies a convenient place for the application of a wrench.

The socket, the bar and the head are provided with a continuous interior passage 17 which is made somewhat larger than the pipe or tube 18 located therein. A T 19 is threaded to the reduced end 20 of the socket 5 and by means of the nipples 21 and 22 connection is made respectively with the inlet and outlet hose 23 and 24. The end of the tube 18 is bent around so that it will enter the nipple 21 into which it is expanded as shown at 25.

Between the detachable head and the ball I provide a chamber, passageway or duct or a series of them which may be formed and disposed in whatever manner seems most desirable. In the present instance I have shown a series of four chambers or ducts 26 which are formed as channels in the detachable head although they might equally well have been formed in the ball. Communication is established between these ducts and the passageway 17 through the small ducts 27. The channels 26 are extended through the threads 28 where the head screws into the supporting bar. That portion of the passageway 17 contained within the head 13 is smaller than the portions in the bar and socket, but is still a trifle larger than the tube 18 which projects well into the head. It will thus be seen that circulation of the cooling fluid takes place as follows: It enters through the hose 23, passes through the tube 18 to the passageway 17 in the head, through the ducts 27, through the channels 26, back through those portions of the channel 17 in the supporting bar and socket, and out through the hose 24. The construction, it will be seen, is exceedingly simple and renewal of the ball 12 can be readily made. I have provided a fluid cooled mandrel which incorporates at the same time the additional feature of a readily replaceable ball.

I claim:

1. A fluid cooled mandrel comprising in combination, a supporting bar, inlet and outlet passages for the fluid in said bar, a detachable head for the bar, a hollow ball through which the head passes secured between said head and the bar, an inlet passage in the head communicating with the inlet passage in the bar, and an outlet passage between the head and the ball communicating with the outlet passage in the bar.

2. A fluid cooled mandrel comprising in combination, a hollow supporting bar, a hollow detachable head, a hollow ball surrounding the head, a tube within the bar and the head, means for supplying fluid to the head through said tube and means for returning the fluid through the bar.

3. A mandrel comprising in combination, a supporting bar having a head, a ball supported thereby, a chamber between the head and the ball, means for supplying cooling fluid to the chamber and means for withdrawing said fluid through the bar.

4. A mandrel comprising in combination, a supporting bar, a detachable head member, a ball adapted to be held in place by said head, a chamber between the head and the ball, means for supplying fluid to the chamber and means for withdrawing the fluid through the bar.

In testimony whereof I have hereunto signed my name.

WESTON JENKINS.